United States Patent [19]

Miller

[11] 3,817,648
[45] June 18, 1974

[54] DRILL SHANK AND CHUCK ASSEMBLY FOR A DRILL PRESS

[75] Inventor: Harold C. Miller, Chicago, Ill.

[73] Assignee: Super-Cut, Inc., Chicago, Ill.

[22] Filed: Nov. 9, 1972

[21] Appl. No.: 305,163

Related U.S. Application Data

[62] Division of Ser. No. 177,774, Sept. 3, 1971, Pat. No. 3,753,622.

[52] U.S. Cl.............. 408/59, 408/141, 408/239, 279/20, 279/24, 279/91
[51] Int. Cl.............. B33b 27/12, B23b 31/08
[58] Field of Search......... 408/59, 57, 56, 238, 239, 408/141; 279/20, 24, 79, 103, 91, 102, 1 B

[56] References Cited
UNITED STATES PATENTS

| 717,199 | 12/1902 | Hollm | 279/103 X |
| 3,024,030 | 3/1962 | Koch | 279/20 |
| 3,347,293 | 10/1967 | Clark | 279/79 X |
| 3,421,392 | 1/1969 | Bangerter et al. | 408/57 |
| 3,487,748 | 1/1970 | Grage | 408/59 X |

*Primary Examiner*—Gil Weidenfeld
*Attorney, Agent, or Firm*—Norman H. Gerlach

[57] ABSTRACT

A drill shank and chuck assembly adapted for use in a drill press or the like and embodying an adapter collet which, by a detent action, enables drill substitution to be effected without drill press adjustment.

1 Claim, 5 Drawing Figures

PATENTED JUN 18 1974 3,817,648

DRILL SHANK AND CHUCK ASSEMBLY FOR A DRILL PRESS

This patent application is a division of my copending application Ser. No. 177,774, filed on Sept. 3, 1971 and entitled "DRILL SHANK AND CHUCK ASSEMBLY FOR A DRILL PRESS", said application having on Aug. 21, 1973 matured into U.S. Pat. No. 3,753,622.

The improved drill shank and chuck assembly comprising the present invention is designed for use primarily in connection with the operative installation of a diamond core drill into the chuck of a drill press, and also the removal of such core drill from the chuck. The invention is, however, not necessarily limited to such use, and shank and chuck assemblies embodying the present invention may, if desired and with substantially no modification, be employed in connection with a wide variety of rotary machine tools having shank portions which are to be rotatively driven and have holding chucks constitute the output driving elements of drill presses or of a wide variety of metal working machines such, for example, as lathes, boring machines, etc., too numerous to mention.

Heretofore, it has been common practice to connect a core drill to the chuck of a drill press or the like by way of a split collet which is associated with and forms a part of the chuck and into which the shank of the core drill is introduced. A bonnet nut which is threadedly received on the collet functions, when tightened, to shrink or contract the collet legs in centripetal fashion about the drill shank, and the relatively high grasping pressure of the collet legs is relied upon as a frictional drive for imparting torque to the core drill from the chuck. Core drill substitution is effected by loosening the bonnet nut in order to release the collet legs so that they automatically expand or spread apart, after which the drill shank may be withdrawn from the collet, the shank of a different core drill inserted into the expanded collet, and the bonnet nut again tightened for collet contracting purposes. With such a procedure, numerous manual operations often requiring the use of a tool, such as a torque wrench, are required. Furthermore, certain functional limitations are present as, for example, drill slippage when insufficient tightening torque is applied to the bonnet nut in order to secure the shank of the core drill in the collet. Additionally, it frequently happens that when the bonnet nut is loosened for drill shank removal purposes, the core drill will fall by gravity from the chuck with resultant breakage, unless, of course, provision is made for holding the core drill during such loosening of the nut. Still further, occasions arise where undue tightening of the bonnet nut on the collet results in damage to the core drill shank as, for example, where the collet legs create small indentations or burrs on the sides of the shank so that, after repeated use, the shank will not fit accurately into the bore of the collet. Another functional limitation is that the bonnet nut is sometimes difficult to grasp for manipulating purposes, especially in a drill press having a multiplicity of closely positioned drill-retaining chucks.

The present invention is designed to overcome the above-noted limitations that are attendant upon the use of a conventional chuck of the split collet type and, toward this end, the invention contemplates the provision of a novel chuck assembly which, for its proper operation, requires a slight modification of the associated core drill shank and, when such modification is made, will enable the core drill shank to be manually pushed into the chuck assembly and become latched therein by a detent action, while at the same time a positive torque drive is automatically established without danger or the possibility of slippage between the core drill shank and the chuck assembly. Removal of the core drill shank for purposes of core drill substitution is accomplished by manually pulling the core drill shank from the chuck assembly. The installation of the core drill shank in the chuck assembly and its removal therefrom is accomplished without necessitating the performance of any operation whatsoever upon the drill press or the latter's chuck assembly, the insertion of the shank being complete as soon as the detent action takes place and removal of the shank being one of manual withdrawal as soon as the detent action has been released.

In carrying out the invention, the conventional split collet which invariably is associated with the chuck of a drill press is removed and, in its place, a novel solid wall collet is substituted, the latter collet fitting snugly into the tapered socket in the drive spindle which formerly received the split collet. A bonnet nut which is threaded onto the solid wall collet functions, not to shrink the collet as heretofore used, but permanently to hold the solid wall collet in position within the spindle socket. The bonnet nut, once applied, is permanently fastened in position against removal.

With the chuck thus permanently installed in the associated drill press, no further drill press manipulations are required and core drill substitution is accomplished by the simple expedient of pulling the shank of an existing installed core drill axially from the collet by the use of manual force and the pushing of a different drill shank into such collet. When the core drill shank is pushed into the collet to its home position, a drive pin which is fixedly secured to the solid wall collet projects into a recess which is provided in the drill shank and automatically furnishes the necessary torque for driving purposes. At the same time, an O-ring which is carried internally of the collet snaps into a latching position within an annular recess which is formed in the drill shank and holds the shank against falling out of the chuck until it is manually pulled therefrom as previously set forth. These functional elements, i.e., the torque drive means and the detent means, are so designed that they in no way interfere with the normal flow of coolant fluid from the central bore of the drive spindle through the core drill shank to the cutting annulus on the lower end region of the core drill.

The provision of a drill shank and chuck assembly such as has briefly been outlined above and possessing the stated advantages constitutes the principal object of the present invention. Numerous other objects and advantages of the invention, not at this time enumerated, will readily suggest themselves as the nature of the invention is better understood from a consideration of the following detailed description.

The invention consists in the several novel features which are hereinafter set forth and are more particularly defined by the claim at the conclusion hereof.

In the accompanying single sheet of drawings forming a part of this specification, one illustrative embodiment of the invention is shown.

Figure 1:
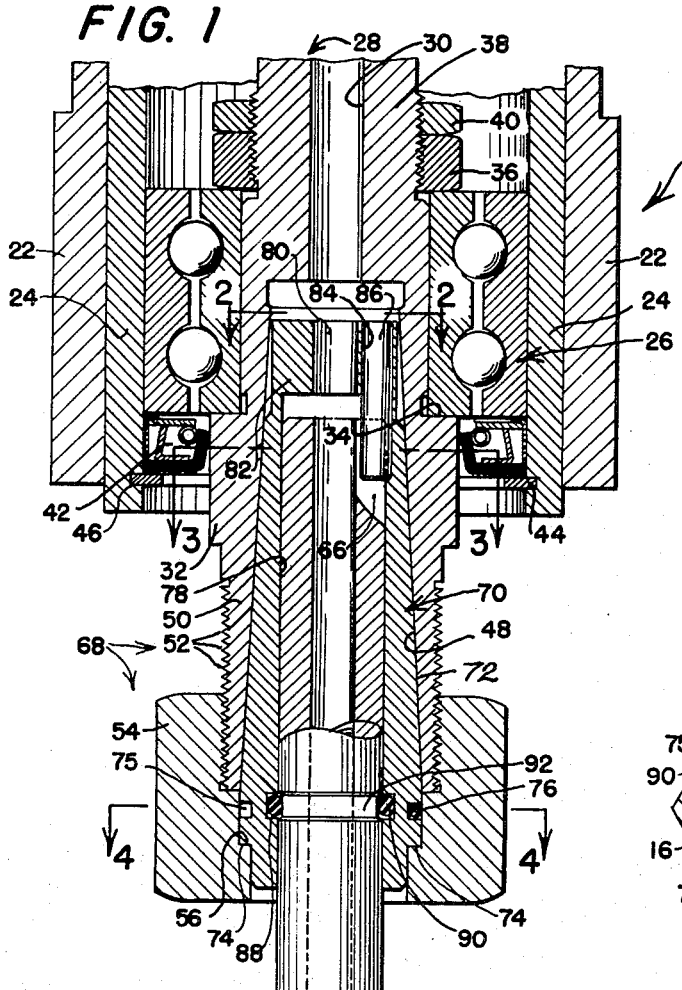
FIG. 1 is a fragmentary sectional view taken substantially centrally and longitudinally through a drill shank and chuck assembly embodying the principles of the present invention, certain parts being shown in elevation in the interests of clarity.

Referring now to the drawings in detail, the present drill shank and chuck assembly is illustrated herein for exemplary purposes as being operatively applied to a normally vertically extending core drill 10 of the type which ordinarily is applied to the chuck of a conventional drill press and is commonly referred to as a tube drill for the reason that it comprises a tubular, thin walled, seamless, metal tube or shank 12. The latter has fixedly connected to its lower end a diamond-impregnated cutting annulus 14, the lower end or rim of which is adapted to engage a ceramic or other workpiece which is to be drilled. Ordinarily, the upper end of the shank 12 of the core drill 10 is adapted in a split collet type chuck in such a manner that the central longitudinal bore 16 which extends through said shank 12 registers in sealing relationship with a hollow tubular spindle so that a suitable coolant such as water may be fed through the tubular shank 12 to the cutting annulus 14.

The present invention, as previously described, is designed to obviate the difficulties which are encountered in applying such a core drill to a conventional split collet type chuck and in removing the drill from the chuck and which ordinarily involve holding the drill with one hand and loosening or tightening the collet by turning the bonnet nut for the collet with the other hand. Accordingly, and as will be described in detail presently, a special type of collet is employed in connection with the drill press chuck while the shank of the core drill is modified accordingly.

The assembled chuck and drill constituting the present invention are illustrated in FIG. 1, and except for the substitution of the novel collet arrangement of the present invention, together with a slight modification of the shank 12 of the core drill 10, no appreciable modification of the drill press housing, the chuck, the spindle, or the rotatable mounting means for the spindle within the housing is required.

The drill press which is illustrated herein is purely conventional and no claim is made herein to any novelty associated with the same, the novelty of the present invention residing solely in the nature of the aforementioned collet which is used with the drill press chuck for operatively holding the core drill 10 during cutting or drilling operations. The drill press is shown in a fragmentary manner and is designated in its entirety by the reference numeral 20, the disclosure including the outer fixed drill press housing 22, the inner vertically slidable quill 24, the lower ball bearing 26, and the drill press drive spindle 28.

Only the lower region of the spindle 28 is disclosed herein, it being understood that the upper portion of such spindle is splined in the usual manner to receive a driving pulley thereover from which the spindle derives its rotary motion. Additionally, a conventional means are provided whereby vertical motion may be applied to the quill 24 to effect up and down sliding motion thereof within the outer shell 22 under the control of a hand wheel or lever (not shown).

The spindle 28 of the drill 20 is tubular and provides a central longitudinal passage 30 by means of which the coolant fluid, which may be water, is fed to the bore 16 in the shank 12 of the core drill 10. The lower region of the spindle 28 is formed with an enlarged section 32 which establishes an upwardly facing shoulder 34. The latter provides a seat for the inner race of the ball bearing 26, and such inner race is clamped against such seat by means of a clamping nut 36 which is received over a threaded section 38 on the spindle 28. A lock nut 40 maintains the nut 36 in its tightened condition. Immediately below the ball bearing 26 is a conventional lip seal 42 which is held in position between the non-rotatable quill 24 and the rotatable spindle 28 by means of a split snap-ring 44 which seats within an annular groove 46 in the lower rim region of the quill 24.

The spindle 28 is provided with the usual collet-receiving socket 48, the latter being upwardly tapered on a relatively small slant angle and the wall 50 of such socket being exteriorly threaded as indicated at 52 for reception thereover of a bonnet nut 54. The latter has an internal annular shoulder 56 by means of which a conventional split collet (not shown) is regulably forced upwardly into the tapered socket 48.

Figure 3:
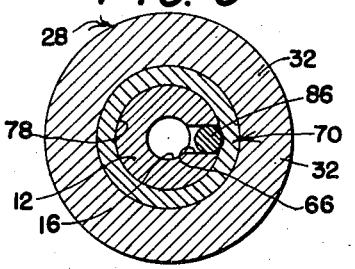
FIG. 3 is a transverse sectional view taken on the line 3—3 of FIG. 1.
Figure 4:
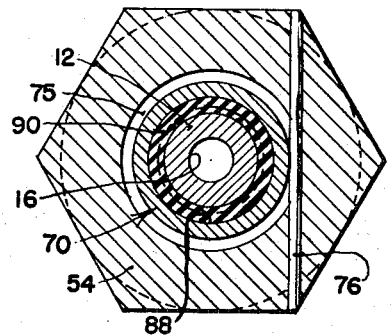
FIG. 4 is a transverse sectional view taken on the line 4—4 of FIG. 1.

Considering now the nature of the diamond-impregnated cutting annulus 14, this annulus is preferably of the general type which is shown and described in U.S. Pat. No. 2,996,061, granted to me on Aug. 15, 1961 and entitled "ABRASIVE DIAMOND CORE DRILL." For a full description of the nature and operation of such annulus, reference may be had to such patent. However, for descriptive purposes herein, it is deemed sufficient to state that the annulus is disposed adjacent to the lower rim of an enlarged cylindrical drilling head 60 which is formed on the lower end of the shank 12, the head being provided with an internal socket 62 which is in communication with the coolant-receiving bore 16 in the shank 12. The outer surface of the enlarged head 60 is provided with a plurality of circumferentially spaced vertical grooves 64 which interrupt the continuity of the cutting annulus 14 and serve the purpose of low friction paths for the flow of coolant fluid upwardly and out of the hole which is being drilled in the workpiece, all in a manner that has clearly been set forth in the specification of aforementioned U.S. Pat. No. 2,995,161. The particular core drill 10, insofar as it has previously been described herein, is thus of conventional construction, the only difference between such core drill and the core drill of the aforementioned patent being in the provision of a relief area in the form of a notch 66 (see FIGS. 1 and 3) which is provided in the wall of the shank 12 at the extreme upper end of the latter, and the function of which will be set forth subsequently. Similarly, the drill press 20, insofar as it has previously been described herein, likewise is of conventional construction. The essential novelty of the present invention resides solely in the provision of a novel drill press chuck assembly 68 embodying a special collet such as is designated by the reference numeral 70, such special collet being in the nature of a substitute for the conventional split collet which ordinarily is disposed with a taper fit within the tapered bore 48 of the tubular spindle 28 of the drill press 20. The invention also involves the manner with which this special frusto-conical collet 70 cooperates with the notched shank 12 of the core drill 10.

Considering now the nature of the special collet 70, this collet is of solid tubular construction (as distinguished from the usual longitudinally split collet) and is provided with an outer frusto-conical wall surface 72 which has a taper or slant angle commensurate with the slant angle of the upwardly tapered socket 48 in the spindle 28 so that, when the collet 70 is forced upwardly into such socket, it will attain a tight taper fit. The lower end region of the collet 70 is provided with a downwardly facing annular shoulder 74 which seats on the aforementioned shoulder 56 of the internally threaded bonnet nut 54. An annular groove 75 extends around the lower region of the collet 70 and a pin 76 which is driven in secant fashion through the nut passes tangentially through the groove 74 and locks the bonnet nut 54 in its tightened position wherein the shoulder 74, by reason of its engagement with the shoulder 56, forces the collet bodily upwardly into tight-fitting relation with respect to the collet-receiving socket 48.

Figure 2:
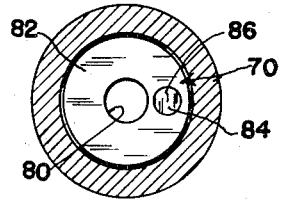
FIG. 2 is a transverse sectional view taken on the line 2—2 of FIG. 1.

The collet 70 has formed therein a relatively deep cylindrical bore or socket 78, the latter communicating with a vertical axial bore 80 which extends through the upper inwardly extending wall portion 82 of the collet 70 at a point above the socket 78. The bore 80, in turn, communicates with the bore 30 in the spindle 28. An offset or eccentric vertically extending bore 84 (see FIG. 2) is provided in the upper wall portion 82 alongside the bore 80 and receives therein with a press fit a vertically disposed downwardly projecting drive pin 86. The latter projects into the notch 66 in the upper end of the core drill shank 12 when the latter is in its proper position with the collet 70.

Figure 5:
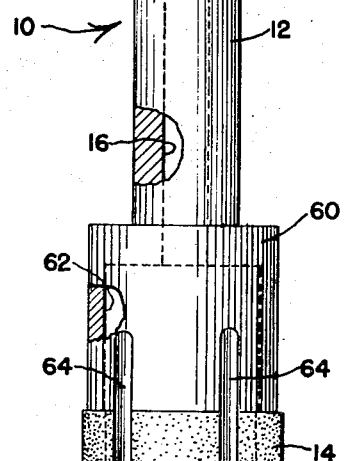
FIG. 5 is a fragmentary side elevational view of the core drill shank which is employed in connection with the invention.
Figure 5:
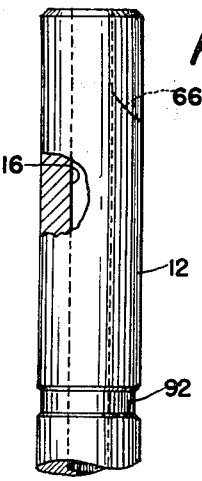

In the lower region of the collet 70 and in the vicinity of the annular groove 75, there is provided an internal annular groove 88 within which there is permanently disposed a detent element in the form of an elastomeric O-ring 90. This O-ring is designed for cooperation with an annular detent groove 92 (see FIG. 5) which is provided in the medial region of the core drill shank 12 for releasably maintaining the core drill in position within the drill press 20 in a manner that will be set forth presently.

It will be understood that in practicing the invention, the conventional drill press 20 is initially conditioned for quick and easy application of the core drill 10 thereto and similar removal of the core drill therefrom. This is accomplished by removing the conventional split collet arrangement which ordinarily is disposed in the collet-receiving socket 48 of the spindle 28 and substituting therefor the solid wall collet 70. After such substitution, the bonnet nut 54 is tightened on the spindle with the locking pin 76 in place within the groove 75. This results in completion of the drill press conversion and there is no further need for manipulating the bonnet nut 54 during core drill application to or removal from the drill press 20.

As previously stated, core drill application to the chuck assembly 68 of the drill press 20 is accomplished by the simple expedient of aligning the shank 12 with the cylindrical bore or socket 78 in the solid wall collet 70 and then forcing the core drill bodily upwardly so that the shank 12 enters such socket. During such insertion of the shank 12 into the socket 78, no thought need be given to the angular or rotational disposition of the shank. If the notch 66 in the upper end of the shank 12 happens to be aligned vertically with the drive pin 86, then the shank will move upwardly to its home position within the collet 70 and the drive pin 86 will enter the notch 66 in driving relationship. If, on the other hand, at the time of introduction of the shank 12 into the bore or socket 78, the notch 66 is not in vertical alignment with the drive pin 86, the upper rim of the core drill shank 12 will strike against the lower end of the drive pin 86 and, then the operator may rotate the core drill 10 bodily about its longitudinal axis, while at the same time continuing to apply upward thrust to the drill until the drive pin 86 and the notch 66 move into alignment, whereupon the core drill shank 12 will move upwardly to its home position and the O-ring 90 will function as a detent member by entering the annular groove 92 (see FIG. 5) in the medial region of the core drill shank 12, thus releasably latching the core drill 10 in its home position. The drill press 20 with the core drill 10 thus installed therein is then ready to be set into operation for cutting purposes.

During actual cutting operations on a workpiece, the drive pin 86 which projects into the notch 66 in the upper end of the drill shank 12 supplies the necessary torque to the core drill 10 for effecting cutting operations.

Removal of the core drill 10 from the drill press 20 is accomplished by merely pulling the former from the latter in a downward direction, thus overcoming the detent action of the elastomeric O-ring 90 which remains within the groove 88 during such withdrawal of the shank 12 from the collet 70.

The invention is not to be limited to the exact arrangement of parts shown in the accompanying drawings or described in this specification as various changes in the details of construction may be restored to without departing from the spirit or scope of the invention. Therefore, only insofar as the invention is particularly pointed out in the accompanying claim is the same to be limited.

Having thus described the invention what I claim as new and desire to secure by letters patent is:

1. In combination, a drill press adapted for use in connection with a fluid-cooled core drill, said drill press comprising a shell, a quill slidable vertically in said shell, a hollow tubular spindle rotatably mounted within said quill for vertical endwise movements bodily with the quill, the lower end of said spindle being formed with a relatively deep frusto-conical socket having an upper wall portion which constitutes the bottom wall of the socket, said bottom wall of the socket being formed with a vertical axial bore therethrough establishing fluid communication between the socket and the interior of the spindle, a tubular frusto-conical collet of solid wall construction disposed within said socket with a taper fit, a bonnet nut threadedly received on the lower end of said spindle and serving to lock the collet in position within said bore, said collet being formed with a central longitudinal bore therein, a core drill having a tubular shank adapted for endwise projection into said longitudinal bore in the collet to a home position therein wherein the interior of the shank is in fluid communication with the axial bore in said bottom wall, cooperating detent means automatically effective between said shank and collet upon projection of the former into said bore for latching said shank within the bore when the shank reaches its home position, said detent means comprising an elastomeric O-ring which is confined in an internal annular recess in the wall of said tubular collet and, in addition, a cooperating external annular recess which is formed in the wall of the core drill shank and into which the O-ring projects when the shank is in its home position, and drive means effective between the collet and shank and likewise effective upon projection of the shank to its home position for transmitting torque from the spindle to the shank, said drive means comprising a drive pin which projects vertically and downwardly through an eccentrically disposed bore in the bottom wall of the socket, and also a notch which is formed in the upper end of the tubular shank and receives the drive pin when the shank is in its home position.

* * * * *